United States Patent [19]
Endoh

[11] Patent Number: 5,301,245
[45] Date of Patent: Apr. 5, 1994

[54] SYSTEM FOR TRANSMITTING A COMMERCIAL PROGRAM IN A CATV SYSTEM

[75] Inventor: Fumio Endoh, Tokyo, Japan
[73] Assignee: Pioneer Electronic Corporation, Tokyo, Japan
[21] Appl. No.: 858,742
[22] Filed: Mar. 27, 1992

[30] Foreign Application Priority Data
Mar. 29, 1991 [JP] Japan .................................. 3-093358
[51] Int. Cl.[5] .............................................. H04K 1/00
[52] U.S. Cl. ........................................... 380/10; 380/20
[58] Field of Search ................ 380/10, 20; 358/86, 358/11

[56] References Cited
U.S. PATENT DOCUMENTS

| | | | |
|---|---|---|---|
| 4,330,794 | 5/1982 | Sherwood | 380/10 |
| 4,648,123 | 3/1987 | Schrock | 358/86 |
| 4,665,427 | 5/1987 | Beckley et al. | 358/11 |
| 4,672,440 | 6/1987 | Trahan | 380/20 |
| 4,980,912 | 12/1990 | Welmer | 380/10 |
| 5,138,659 | 8/1992 | Kelkar et al. | 380/20 |

OTHER PUBLICATIONS

"Videocipher Secure Television Scrambling Systems" General Instruments (Feb. 1, 1987) pp. 1–8.

Primary Examiner—Salvatore Cangialosi
Attorney, Agent, or Firm—Nikaido, Marmelstein, Murray & Oram

[57] ABSTRACT

A CATV system includes a broadcasting station, a satellite, and a local center. Scrambled television signals transmitted from the broadcasting station to the local center through the satellite are descrambled and re-scrambled at the local center, and the re-scrambled TV signals are transmitted to terminal devices. A non-scrambled TV signal included in the TV signal transmitted from the broadcasting station to the local center is detected. The detected non-scrambled TV signal is transmitted to terminal devices without scrambling.

8 Claims, 4 Drawing Sheets

SYSTEM FOR TRANSMITTING A COMMERCIAL PROGRAM IN A CATV SYSTEM

FIELD OF THE INVENTION

The present invention relates to a system for broadcasting a commercial program in a CATV system, and more particularly to a system for broadcasting a commercial program such as a program preview to invite non-subscribers to enter into a contract with the broadcaster.

BACKGROUND OF THE INVENTION

A CATV system using a communication satellite or a broadcasting satellite is consisted of a broadcasting station, the satellite, a local CATV center, and a plurality of terminal devices of subscribers.

The television (TV) signal from the broadcasting station to the local CATV center through the satellite is scrambled with a high level encoding. In order to descramble the highly scrambled TV signal, an expensive decoder is necessary. Such an expensive decoder is not suitable for subscribers. Therefore, the local center descrambles the TV signal and re-scrambles it with a low level encoding suitable for the subscribers. However, if the TV signal for the commercial program is scrambled, non-subscribers cannot watch the commercial program. Therefore, the broadcasting station must transmit the TV signal for the commercial program without scrambling, and the local CATV center must not scramble the TV signal.

SUMMARY OF THE INVENTION

An object of the present invention is to provide a system enabling a local CATV center of a CATV system to transmit a TV signal for a commercial program without scrambling.

According to the present invention, there is provided a system for transmitting television signals in a CATV system wherein a television signal is scrambled with an encoding at a broadcasting station, the scrambled television signal is transmitted from the broadcasting station to a local center through a satellite, and descrambled at the local center, the descrambled television signal is re-scrambled with another encoding at the local center, the re-scrambled TV signal is transmitted to terminal devices, the system comprising detector means provided in the local center for detecting a non-scrambled TV signal included in the TV signal transmitted from the broadcasting station and for producing a non-scramble signal when detected, and transmitting means responsive to the non-scramble signal for transmitting the non-scrambled TV signal to terminal devices without scrambling.

In an aspect of the invention, the detector means comprises signal detector means for detecting nonexistence of a scramble state indicating signal included in the TV signal and for producing the non-scramble signal, and decoding means for descrambling the TV signal in accordance with the scramble state indicating signal, and the transmitting means includes encoding means for re-scrambling a descrambled TV signal in accordance with detection of the scramble state indicating means. The transmitting means includes a switch operable to transmit the non-scrambled TV signal without passing the encoding means in accordance with the non-scramble signal. The transmitting means may include timing means responsive to the scramble state indicating signal for operating the encoding means at a proper timing. The transmitting means may further include means for changing a frequency of the TV signal to another frequency for terminal devices of un-subscribers.

The other objects and features of this invention will become understood from the following description with reference to the accompanying drawings.

DETAILED DESCRIPTION OF THE PREFERRED EMBODIMENT

Figure 1:
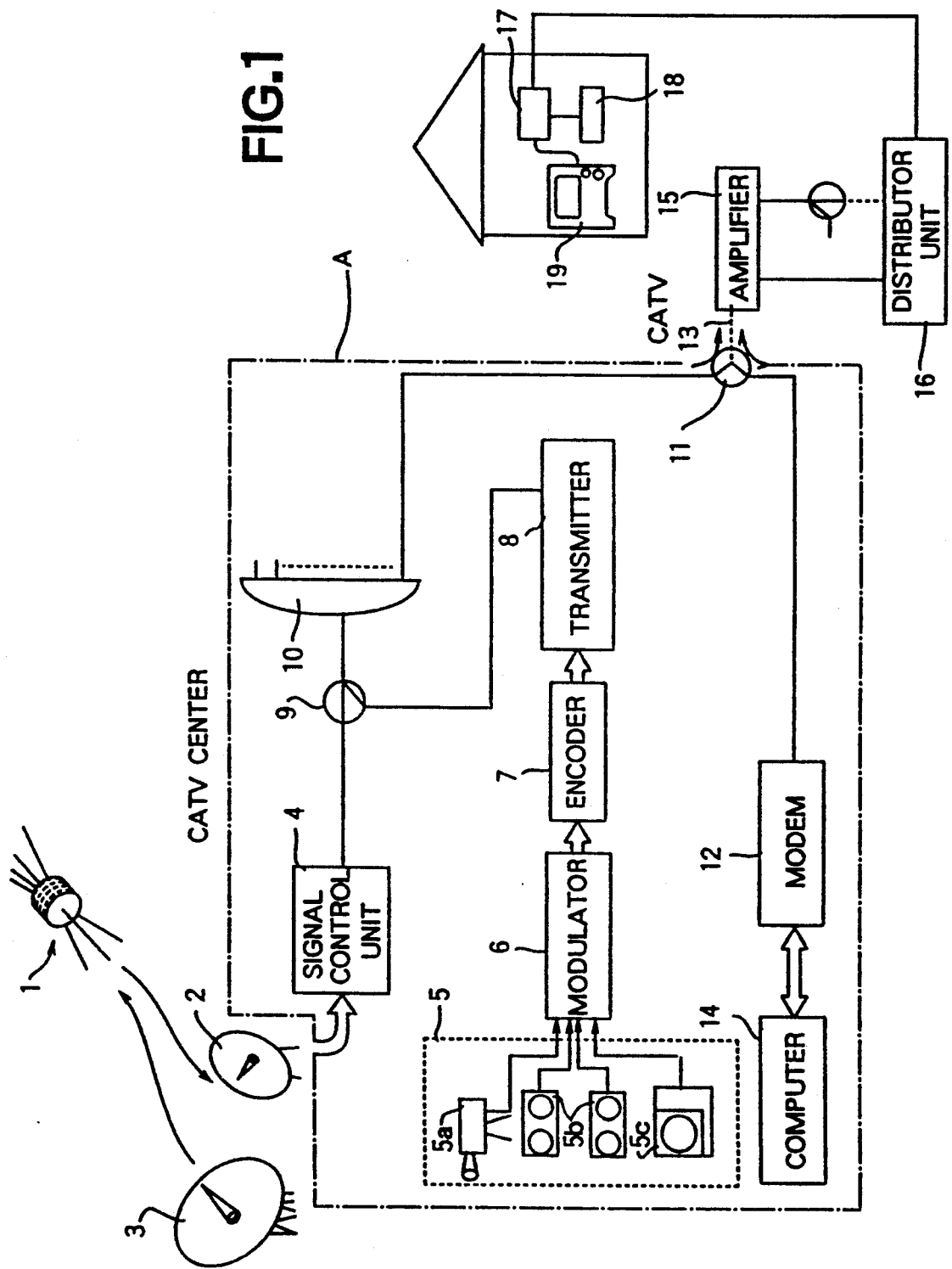
FIG. 1 is a block diagram showing a CATV system.

Referring to FIG. 1, a local CATV center A has a TV signal control unit 4 according to the present invention, which system detects and controls descrambling and scrambling TV signals transmitted from a broadcasting station 3 through a satellite 1 and an antenna 2. The CATV center is provided with a TV signal source 5 for generating TV signals for the local subscribers, a modulator 6, an encoder 7 for scrambling the TV signals, a transmitter 8, a combiner 9 for combining the TV signal with the TV signal from the broadcasting station, a distributor 10, and a combiner 11. The TV signal source 5 includes a TV camera 5a, VTRs 5b and a video disk 5c. A computer 14 is provided for transmitting a data downstream signal through a data modem 12, combiner 11 and a line 13 and for receiving an upstream signal. The TV signal and the downstream signal are supplied to terminal devices 17 through an amplifier 15 and a distributor unit 16. The terminal device 17 is connected to a remote control box 18 and a TV receiver 19.

Figure 4:
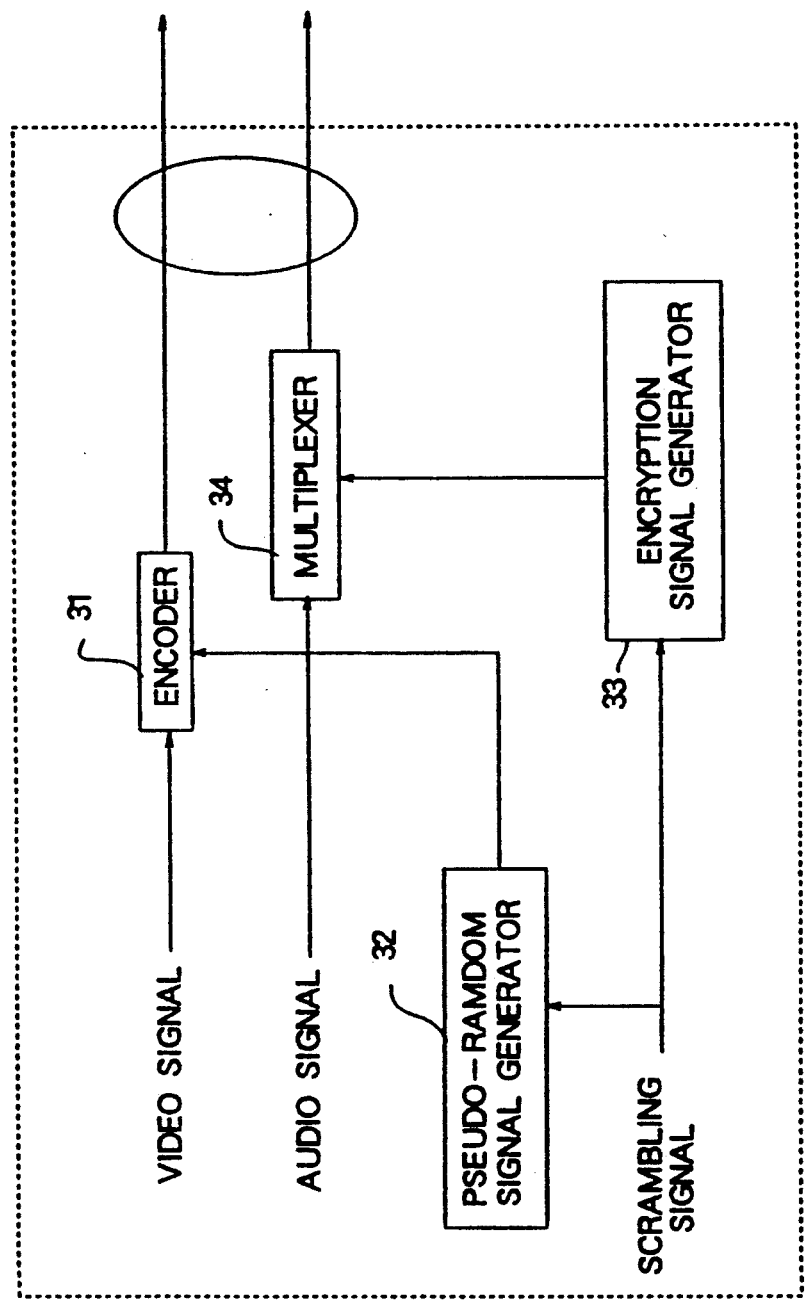
FIG. 4 is a block diagram showing a part of a transmitting system of a broadcasting station.

Referring to FIG. 4 showing the transmitting system of the broadcasting station 3. The system is adapted to generate a scrambling signal for scrambling a necessary video signal. The scrambling signal is applied to a pseudo-random signal generator 32 and an encryption signal generator 33. In response to the scrambling signal, the pseudo-random signal generator 32 produces a pseudo-random signal which is applied to a video signal encoder 31. The encoder 31 scrambles a video signal except for a video signal for a commercial program in accordance with the pseudo-random signal, and inserts a scramble state indicating signal $S_{s1}$ in the video signal before the scrambled video signal.

The encryption signal generator 33 generates an encryption signal in response to the scrambling signal. The encryption signal is applied to a multiplexer 34 where the encryption signal is multiplexed with an audio signal.

Figure 2:
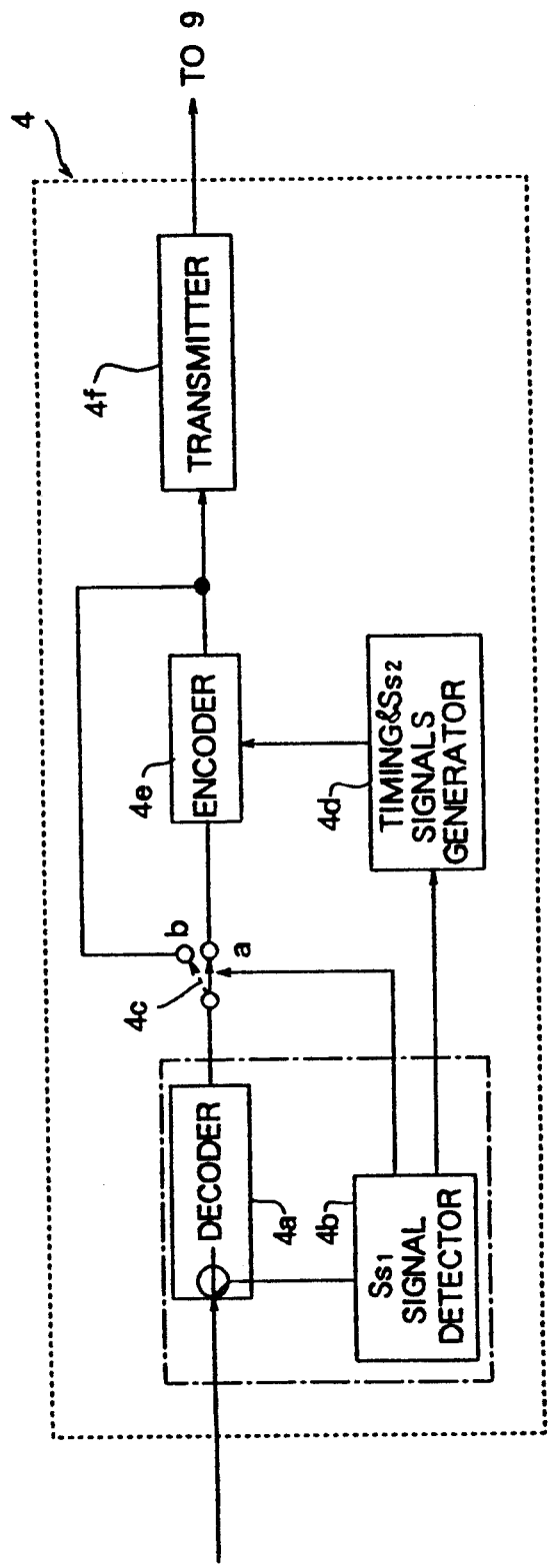
FIG. 2 is a block diagram of a TV signal control unit at a local center.

Referring to FIG. 2 showing the TV signal control unit 4, the unit has a decoder 4a and an $S_{s1}$ signal detector 4b. The $S_{s1}$ signal detector 4b detects an $S_{s1}$ signal in the video signal from the broadcasting station. The decoder 4a descrambles the scrambled video signal in accordance with the detection of the $S_{s1}$ signal. Upon the detection of the $S_{s1}$ signal, the detector 4b produces an output signal which is applied to a changeover switch 4c and a timing signal and an $S_{s2}$ signal generator 4d. A timing signal and an $S_{s2}$ signal are applied from the generator 4d to an encoder 4e.

Figure 3:
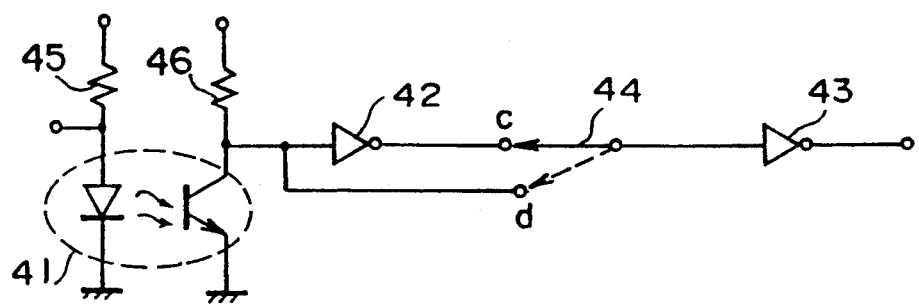
FIG. 3 is a circuit of a part of the system of FIG. 2.

FIG. 3 shows the $S_{s1}$ signal detector 4b of FIG. 2. The detector 4b receives the video signal from the decoder 4a through a photo coupler 41 comprising a photo diode and a photo transistor. Thus, the detector 4b detects exactly the $S_{s1}$ signal without receiving noises from the decoder 4a. The detector 4b has invertors 42 and 43, a manual switch 44, and voltage setting resistors 45 and 46.

In operation, when the $S_{s1}$ detector 4b detects the $S_{s1}$ signal in the video signal, the decoder 4a descrambles the video signal. The output signal of the detector 4b causes the switch 4c to close a contact a thereof, and causes the generator 4d to generate a timing signal and an $S_{s2}$ signal. The encoder 4e scrambles the video signal from the decoder 4a and inserts the $S_{s2}$ signal in the video signal before the scrambled video signal in accordance with the timing by the timing signal. The scrambled video signal is transmitted to the terminal devices 17 of subscribers through a transmitter 4f.

If an $S_{s1}$ signal is not detected in a video signal which is a commercial program, the $S_{s1}$ signal detector 4b produces a non-scramble signal. In accordance with the non-scramble signal, the switch 4c operates to close a contact b, and the generator 4d does not generate the $S_{s2}$ signal. Thus, the commercial program is transmitted from the transmitter 4f without scrambling at the encoder 4e.

The transmitter 4f may be adapted to transmit a video signal having another frequency than the received video signal for transmitting the commercial program to non-subscribers.

Although, in the above described embodiment, the non-scrambled TV signal is detected from the video signal, the non-scrambled TV signal can be detected by detecting the encryption signal in the audio signal.

From the foregoing, it will be understood that the present invention provides a system for transmitting a commercial program fed from the broadcasting station to nonsubscribers without scrambling.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for transmitting television signals in a CATV system wherein a television signal of a priority channel is selectively scrambled with an encoding at a broadcasting station to produce in the priority channel 1) a scrambled television signal for terminal devices of subscribers and 2) non-scrambled television signal for non-subscribers used for transmitting a commercial program, the scrambled and non-scrambled television signals are alternately transmitted from the broadcasting station to a local center in the priority channel, and the scrambled television signal is descrambled at the local center, the descrambled television signal is re-scrambled by an encoder with another encoding at the local center, the re-scrambled television signal and the non-scrambled television signal are alternately transmitted to terminal devices wherein the system comprises:

detector means, provided in the local center, for detecting said scrambled television signal and said non-scrambled television signal in the priority channel and said detector means for producing a scrambled signal and a non-scrambled signal in accordance with said detected signals;

switching means, responsive to said scrambled signal, for feeding said descrambled television signal to said encoder for re-scrambling said television signal, and responsive to said non-scrambled signal for passing said non-scrambled television signal without passing through said encoder; and transmitting means for alternately transmitting said re-scrambled television signal and said non-scrambled television signal to subscriber and non-subscriber terminal devices.

2. A system according to claim 1 wherein the detector means comprises signal detector means for detecting nonexistence of a scramble state indicating signal included in the television signal and for producing the non-scramble signal, and decoding means for descrambling the television signal in accordance with the scramble state indicating signal.

3. A system according to claim 2 wherein the transmitting means includes said encoder for re-scrambling a descrambled television signal in accordance with detection of the scramble state indicating signal.

4. A system according to claim 3 wherein the transmitting means includes timing means responsive to the scramble state indicating signal for operating the encoder at a proper timing.

5. A system according to claim 3 wherein the transmitting means includes means for changing a frequency of the television signal to another frequency for terminal devices of non-subscribers.

6. A system for a local center to which 1) scrambled television signals through a plurality of priority channels of respective scrambling systems and 2) non-scrambled television signals through said plurality of priority channels are applied from broadcasting stations, wherein said scrambled television signal and the non-scrambled television signal of each priority channel are alternately transmitted, and the scrambled television signals are re-scrambled with a re-scrambling system at the local center, the system comprising:

detector means for detecting each of the scrambled television signals and for producing a scramble signal when detected;

descrambling means for descrambling the scrambled television signal;

re-scrambling means for re-scrambling the descrambled television signals with a re-scrambling system; and transmitting means for transmitting the re-scrambled television signal to a plurality of terminal devices.

7. A system according to claim 6, wherein non-scrambled television signals are also applied to the terminal devices.

8. A system according to claim 6, wherein the scrambled television signals are transmitted to the local center through a satellite.

* * * * *